United States Patent [19]

Maillefer

[11] Patent Number: 5,172,516
[45] Date of Patent: Dec. 22, 1992

[54] DEVICE FOR HORTICULTURE

[76] Inventor: James Maillefer, 25/27 chemin Petray, chemin Blemant, 1245 Collonges-Bellerive (Geneva), Switzerland

[21] Appl. No.: 414,743

[22] Filed: Sep. 27, 1989

Related U.S. Application Data

[63] Continuation of Ser. No. 928,346, Nov. 10, 1986, abandoned, which is a continuation-in-part of Ser. No. 728,503, Apr. 26, 1985, Pat. No. 4,667,439.

[30] Foreign Application Priority Data

Nov. 29, 1984 [CH]  Switzerland ............... 5693/84
Nov. 29, 1985 [CH]  Switzerland ............. 05113/85

[51] Int. Cl.⁵ .................................. A01G 25/00
[52] U.S. Cl. ................................................ 47/80
[58] Field of Search .............. 47/59, 66, 77, 80, 86, 47/87

[56] References Cited

U.S. PATENT DOCUMENTS

| | | | |
|---|---|---|---|
| D. 242,267 | 11/1976 | Fenney | 47/59 |
| 2,554,302 | 5/1951 | Keskitalo | 47/81 |
| 3,298,133 | 1/1987 | Courtright | 47/87 |
| 3,576,088 | 4/1971 | Arca | 47/81 |
| 4,008,544 | 2/1977 | Rupprecht et al. | 47/77 |
| 4,057,931 | 11/1977 | Stutelberg et al. | 47/66 |
| 4,096,663 | 6/1978 | Silver | 47/80 |
| 4,213,274 | 7/1980 | Skaife | 47/86 |
| 4,248,013 | 2/1981 | Allen | 47/80 X |
| 4,276,720 | 7/1981 | Lyon | 47/81 X |
| 4,341,040 | 7/1982 | Smith | 47/66 |
| 4,428,151 | 1/1984 | Solomon | 47/81 |
| 4,468,885 | 9/1984 | Mandish | 47/59 |
| 4,531,324 | 7/1985 | Yang et al. | 47/59 |
| 4,667,439 | 5/1987 | Maillefer | 47/66 |

FOREIGN PATENT DOCUMENTS

| | | | |
|---|---|---|---|
| 2233146 | 1/1974 | Fed. Rep. of Germany | 47/66 |
| 2228418 | 12/1974 | France | 47/86 |
| 1501374 | 2/1978 | United Kingdom | 47/81 |

Primary Examiner—Robert A. Hafer
Assistant Examiner—Kevin Rooney
Attorney, Agent, or Firm—Anthony A. O'Brien

[57] ABSTRACT

The device consists of a flowerpot (1), mounted on feet (8), intended to be placed in a horticulture tray, comprising a bottom (5) pierced with holes (7) and exhibiting parallel slots (6, 6a). It is made in one piece by molding from expanded polystyrene.

6 Claims, 3 Drawing Sheets

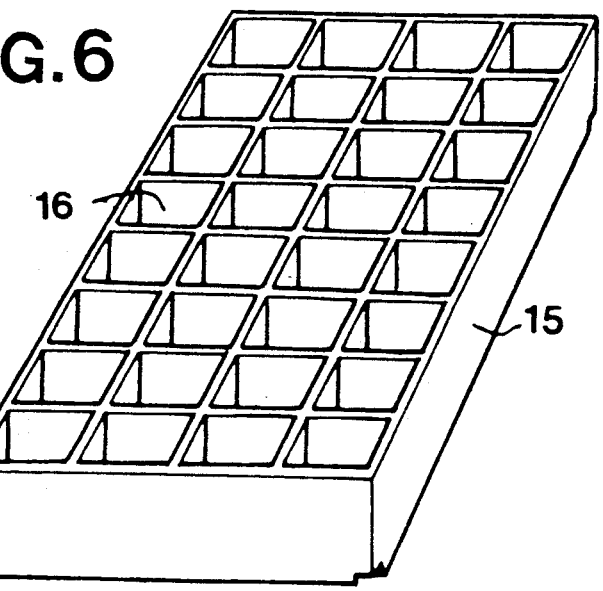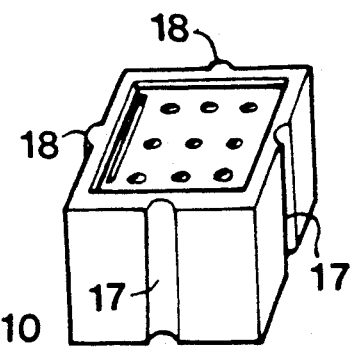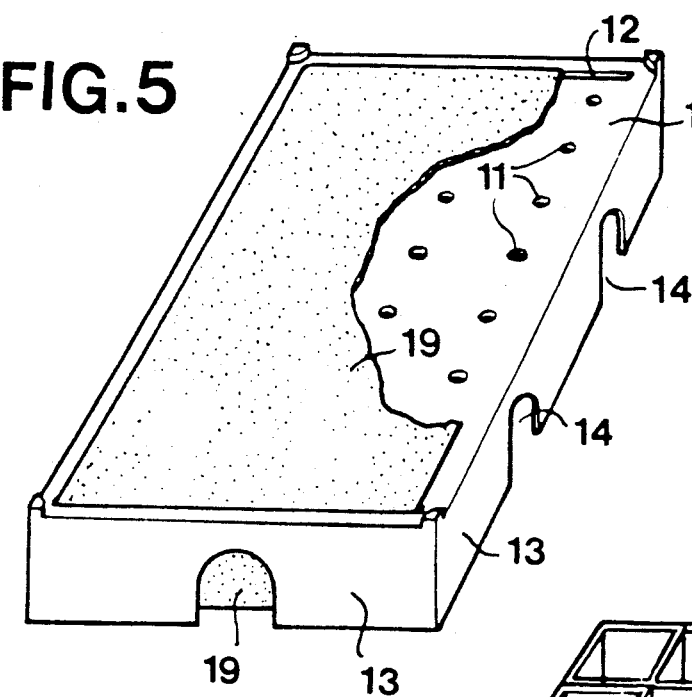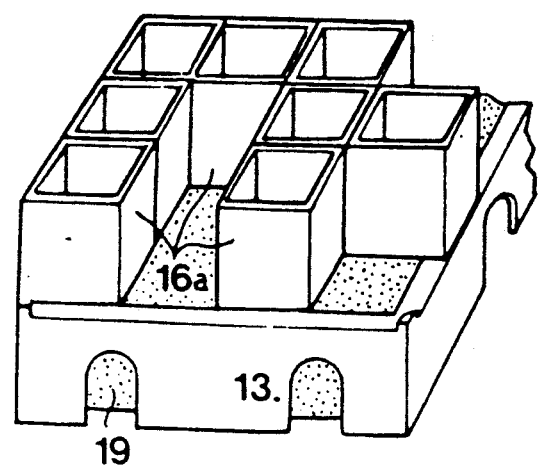

DEVICE FOR HORTICULTURE

This application is a continuation of copending application Ser. No. 728,346 filed Nov. 1986, now abandoned and which is a continuation-in-part of copending application, Ser. No. 728 503, filed Apr. 26, 1985, now U.S. Pat. No. 4,667,439 granted May 26, 1987.

The present invention has for its object, flower pots intended to be disposed in a horticultural tank and more particularly, in a tank used in hydroculture.

The invention has as its object a device for horticulture comprising an enclosure intended to receive soil, this enclosure exhibiting a bottom pierced with holes, this bottom exhibiting supports projecting on its lower face.

It is already known from Swiss Patent No. 639,241 to provide a combination comprising a tank in which pots are disposed and in the interior of which a grill for supporting compost is mounted and the bottom of which is pierced with holes and is mounted on feet. However, the mounting of the grill in the pot and the cost of the grill itself are tedious and relatively burdensome.

In order to obviate these inconveniences, a flower pot according to the present invention comprises a bottom pierced with holes and supported by feet and is characterized in that it is made in a single molded piece, the bottom further being provided with transverse parallel slots permitting the introduction therein of a capillary fabric intended to cover the pierced holes in the bottom of the pot.

The attached drawings show schematically and by way of example, a preferred form of execution relating to the invention.

FIG. 5 shows the lower part of another embodiment of the device consisting of two main parts;

FIG. 6 shows the upper part which is intended to be placed on the lower part shown in FIG. 5;

FIG. 7 shows a variant of a lower part of the type of part shown in FIG. 5; and

FIG. 8 shows a variant of the upper part shown in FIG. 6.

Figure 1:
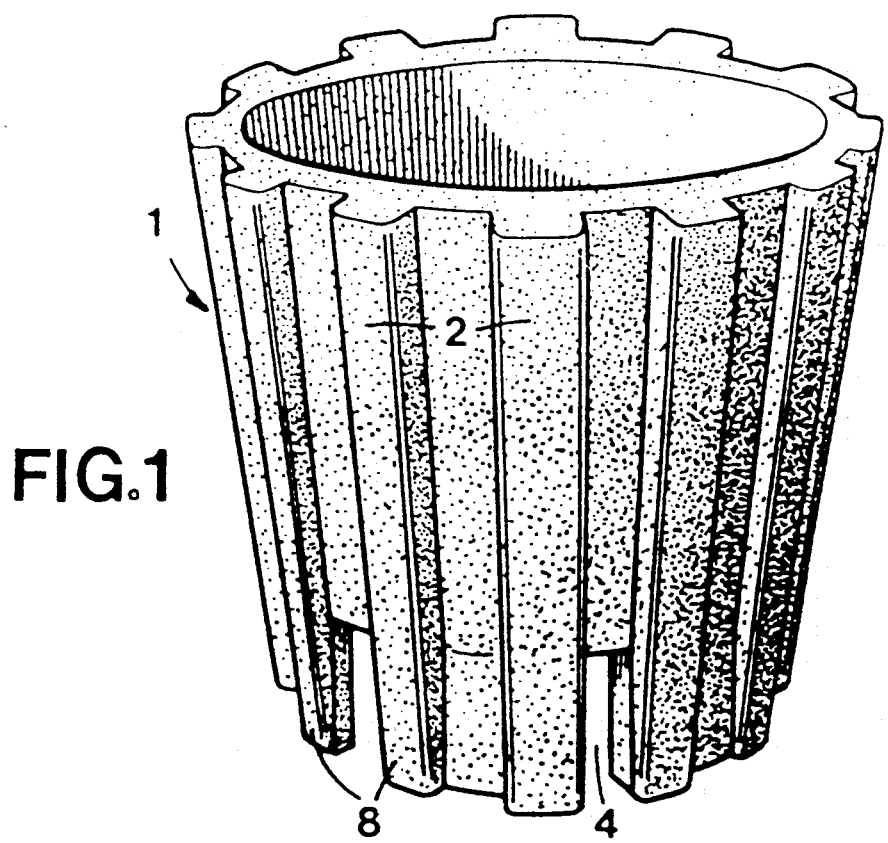
FIG. 1 is an elevational view of a first embodiment of the invention.
Figure 2:
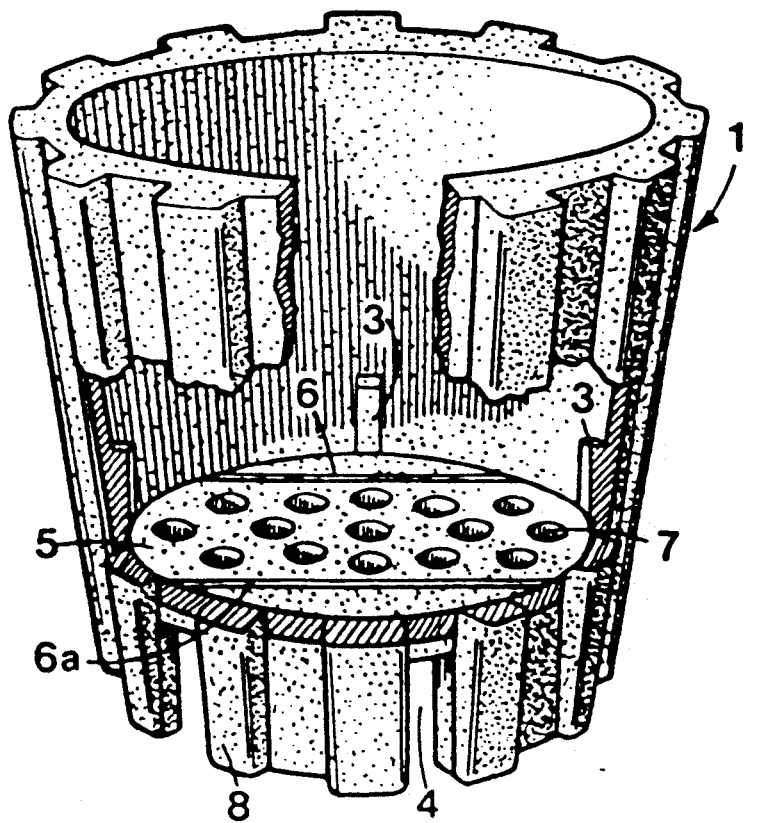
FIG. 2 is an elevational view partly broken away of the embodiment of FIG. 1.
Figure 4:
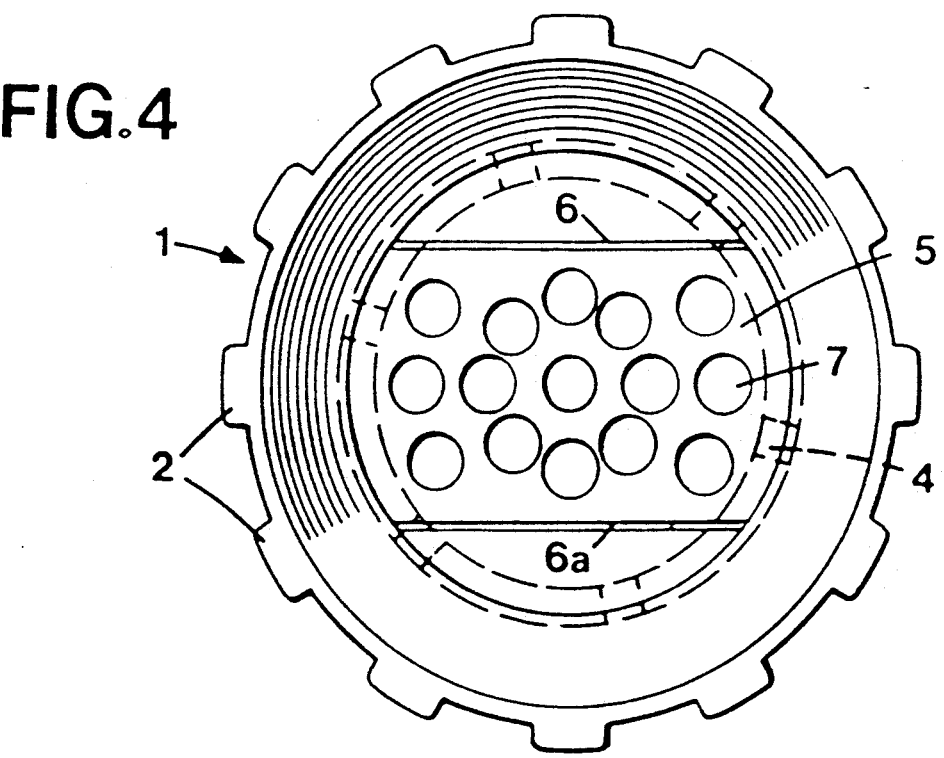
FIG. 4 is a top plan view of the embodiment of FIG. 1.
Figure 3:
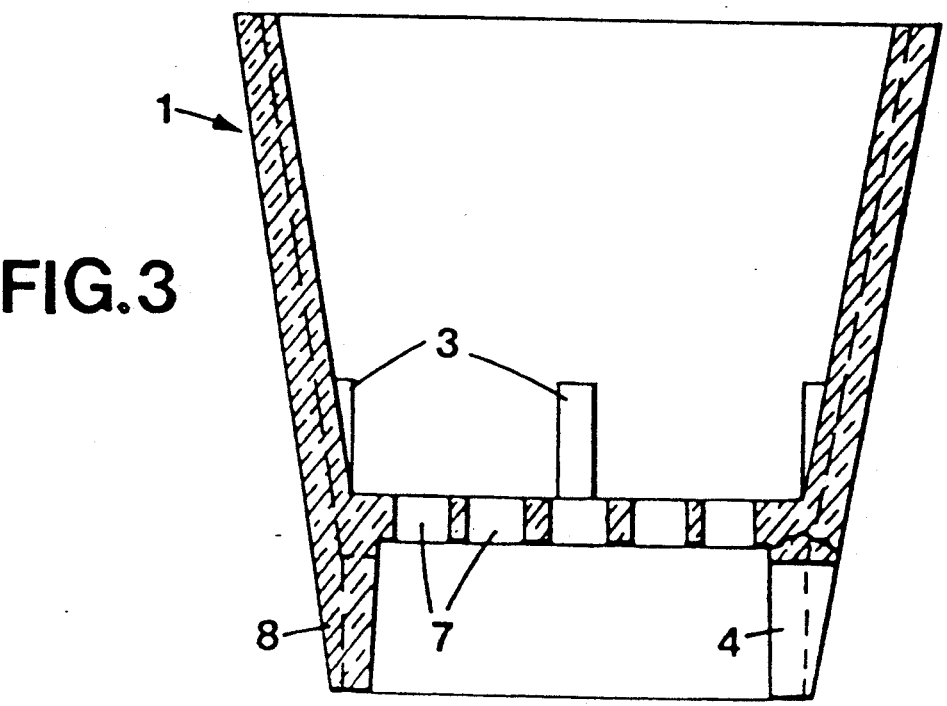
FIG. 3 is a vertical sectional view of FIG. 1.

FIGS. 1 to 4 relate to an embodiment of the device in the form of a flower pot. Preferably, the pots 1 are of truncated conical shape and made of expanded polystyrene or any other plastic material such as, for example, a product sold under the name of "Sagex".

It is also preferable that the pots are reinforced by external ribs 2 and can be provided with internal supports 3 for stacking one within the other for packaging.

A plurality of venilation openings 4 are arranged between the ribs 2 at the base of the pots. Venilation openings 4 are made between the lower parts of ribs 2, which thus form supports projecting from the lower face of bottom and act as legs 8.

The bottoms of the pots are provided with transverse parallel slots 6,6a to permit engagement therein of the edges of a capillary cloth covering the holes 7 while soaking in the water in the tank.

While it is particularly advantageous to make the pots 1 of expanded polystyrene, in view of its cost and light weight, it is possible to make the pots of any other material such as terra cotta.

As FIGS. 5 and 6 show, it is possible to make devices quite suitable for horticulture and in which it is possible to make several plants grow simultaneously. This device comprises a lower part shown in FIG. 5 and comprising a bottom 10 pierced by aeration holes 11 and exhibiting two parallel slots 12 for passage of a capillary mat 19. This bottom exhibits lateral partitions 13 exhibiting openings 14 for the passage of air and water. Actually, the device is intended to be placed in a tray containing water some centimeters deep. Thus, the capillary mat is impregnated with water to wet the entire upper face of bottom 10. Above the lower part, according to FIG. 5, is placed upper part 15, shown in FIG. 6, which exhibits the shape of a frame surrounding a series of cells 16 opening on both main faces of this upper part. The latter therefore constitutes an enclosure intended to receive the compost for growing.

For the growing of plants, generally a series of lower parts are placed, as shown in FIG. 5, in an elongated tray containing water, and each of these lower parts is covered by an upper part, as shown in FIG. 6. The cells are filled with compost and each of them is intended to receive a plant. When the growth of these plants is sufficient, the horticulturist can unpot them to transplant them in a larger pot.

It is advantageous to provide guide means for fitting together the upper and lower parts that are hollow and in relief. The guide means fix the position between the upper and lower parts.

FIG. 7 shows a variant of the lower part of the device, a variant in which several parts can be assembled to form a base with a larger surface. For this purpose, two lateral sides of each lower part exhibit grooves 17, while the other two opposite sides exhibit ribs 18. It is thus possible to assemble several similar parts by engaging the ribs in the grooves. The assembled parts can be of different, but standard, sizes, to be able to be assembled with one other.

The device can also be made in the shape of a round plate or in any other shape, like the bottom of the pots, and be placed in the bottom of the growing pots with the bottom open and blocked about 5 cm from the base of the pot. The pots in this case would be of impact polystyrene or any other solid material. The pots would be designed according to the system described above with legs and aeration holes. The ribs could be on the inside to favor rooting of the plants.

It is understood that it is possible to provide numerous variants of the embodiments of the invention without going outside the scope of the invention.

In the case of the lower part, shown in FIG. 5, slots 12 could be omitted, the capillary mat then being simply placed on the lower part and made long or wide enough for at least one of its edges to fall over one or more of its lateral partitions 13 to soak in the water contained in the tray.

The upper part could, of course, also consist of several elements 16a juxtaposed or even placed at a distance from one another.

In the unit described, the device has been provided to be of expanded synthetic resin, but it is clear that it is possible to use any other material particularly to make the device of terra cotta.

I claim:

1. A device for horticulture adapted to be placed on a tray containing a water supply, said device comprising substantially vertical wall means (13) defining a space therein communicating with the water supply, a horizontal partition (10) on said wall means (13) to close an upper part of said space, a plurality of spaced holes (11) in said partition (10) said wall means (13) having apertures (14) for passage of water from the tray into a lower part of said space characterized in that a capillary mat (19) covers said horizontal partition (10) and has parts thereof extending below said partition (10) into the water int he lower part of said space, said apertures (14) being at a lower portion of said wall means (13) whereby water and air may circulate beneath said horizontal partition (10) to provide ventilation of said space, and wherein said wall means (13) have opposite sides and said apertures (14) are located in said opposite sides to enhance air ventilation in said space.

2. A device according to claim 1 wherein said wall means (13) extends above said partition (10) to provide an area adapted to receive soil for cultivating a plant.

3. A device according to claim 1 wherein said partition has a pair of spaced parallel slots through which said mat is passed.

4. A device according to claim 3 wherein said pair of parallel slots are located on two opposite sides whereby said mat parts has two edge portions extending through said opposite sides.

5. A device according to claim 1, wherein said upper part includes a plurality of separated spaces opening upwardly and downwardly.

6. A device for horticulture comprising a pot made in one piece of molded material adapted to receive soil and to be placed on a horticulture tray containing water, said pot having a bottom pierced with a plurality of holes, a capillary mat covering said bottom and having a part thereof which hangs down from the bottom to absorb water from the horticulture tray, wherein said pot is provided with at least one passage for said capillary mat, the bottom of said pot having a pair of parallel slots positioned on opposite sides of said plurality of holes and extending through said bottom for receiving one end of said capillary mat passed therethrough, such that said mat extends between said slots and across said plurality of holes, said pot having a plurality of integral legs projecting downwardly from said bottom for supporting said pot above the horticulture tray, and a plurality of openings, one between each adjacent pair of said legs for permitting water and air to circulate beneath said bottom to provide ventilation of the soil through said holes in said bottom, wherein said pot is tapered towards said bottom and said pot has an inside wall, stops are disposed on said inside wall whereby a second pot may be nested thereon, wherein said pot is made of expanded polystyrene, and wherein said pot has an outside wall, and reinforcing ribs are equally spaced from each other on said outside wall.

* * * * *